UNITED STATES PATENT OFFICE 2,446,233

PREPARATION OF ALKALI METAL SALTS AND ALKALI EARTH METAL SALTS OF HALOGENATED LOWER FATTY ACIDS

Bayard T. Lamborn, Matawan, N. J., assignor to Hercules Powder Company, Wilmington, Del., a corporation of Delaware No Drawing. Application November 20, 1946, Serial No. 711,209

19 Claims. (Cl. 260—539)

This invention relates to the preparation of salts of lower fatty acids and more particularly to the preparation of alkali metal salts and alkali earth metal salts of halogenated lower fatty acids.

Preparation of the alkali metal salts and the alkali earth metal salts of halogenated lower fatty acids has heretofore been carried out by reacting the necessary ingredients in aqueous solution. Such procedure requires long reaction times and considerable reaction space due to foaming but is normally satisfactory where it is feasible to use the product formed without further processing. However, in some processes, it is desirable to utilize the material in a substantially dry powdery form. In such cases the additional processing required to recover the material in this form adds to the cost of the process and is economically disadvantageous.

In accordance with the present invention it has been discovered that the alkali metal salts and the alkali earth metal salts of halogenated lower fatty acids may be prepared by reacting the desired ingredients in a substantially dry state and that a dry, powdery, easily handled salt results.

Generally described, the process of this invention may be carried out by mixing in a substantially dry state a crystalline halogenated lower fatty acid, such as crystalline chloroacetic acid, with a crystalline alkali metal salt or alkali earth metal salt, such as crystalline sodium carbonate or magnesium carbonate. The reaction which takes place in the case of crystalline chloroacetic acid and crystalline sodium carbonate is illustrated in the following equation, the product formed thereby consisting of approximately 93% sodium chloroacetate with 7% water.

$$2ClCH_2COOH + Na_2CO_3 \rightarrow$$
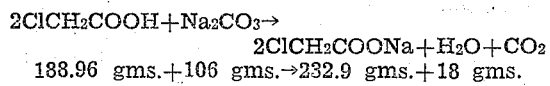
$$2ClCH_2COONa + H_2O + CO_2$$
188.96 gms.+106 gms.→232.9 gms.+18 gms.

Having described the invention in general terms, the following examples are given to illustrate specific embodiment thereof. All parts are by weight unless otherwise specified.

Example I

One hundred sixty-seven parts of dry soda ash (Na₂CO₃) were placed in a mixer and 294 parts of crystalline monochloroacetic acid mixed therewith. Mixing was continued for ¾ hour. The reaction proceeded substantially to completion with very little evolution of heat. The sodium chloroacetate formed was in a dry, powdery state.

Example II

Sixteen and eight-tenths parts of substantially dry sodium bicarbonate and 18.8 parts of crystalline monochloroacetic acid were mixed together as in Example I. The reaction proceeded with a slight cooling effect. The sodium chloroacetate formed was dry enough to handle but showed a slight tendency to cake.

Example III

Thirteen and eight-tenths parts of crystalline potassium carbonate and 18.8 parts of crystalline monochloroacetic acid were mixed as in Example I. This reaction proceeded with a slightly greater evolution of heat than with sodium carbonate. The product was a dry powder comprising potassium chloroacetate.

Example IV

Forty-nine parts of crystalline magnesium carbonate (24.5% Mg), 106 parts of crystalline sodium carbonate and 280 parts of crystalline monochloroacetic acid were mixed as in Example I. The resulting product was a substantially dry, powdery mixture of magnesium chloroacetate and sodium chloroacetate.

Example V

Twenty parts of B-chloropropionic acid crystals were crushed in a mortar and then intimately mixed in the same vessel, with 9.8 parts of dry sodium carbonate. The mass became slightly pasty on reacting but within 30 minutes changed to a dry, friable mass. The reaction was substantially complete since very few bubbles of $CO_2$ formed when the powder was dissolved in water.

In accordance with the novel process of the present invention the alkali metal salts and alkali earth metal salts of halogenated lower fatty acids are prepared by mixing in the dry or crystalline state without solvent, substantially stoichiometrical amounts of a halogenated lower fatty acid and an alkali metal carbonate or alkali earth metal carbonate. Any suitable type of mixing and/or mixing and grinding device whereby the ingredients are intimately contacted and/or ground may be utilized for carrying out the process. For large scale batches, the neutralization of the acid by the carbonate can best be accomplished in a reactor such as a Werner-Pfleiderer, pony or ribbon mixer. However, for small amounts it may be done as simply as mixing the two ingredients together in a beaker with intermittent stirring.

The reaction may be carried out under any conditions of temperature and pressure consistent with maintaining the ingredients in powder or granular form. Thus the pressure may be atmospheric, sub-atmospheric or superatmospheric, depending on the conditions of reaction, materials being reacted and the ends sought. Temperatures may vary from about 0° C. to about 65° C., depending on the pressure, time of treatment, etc. Preferably, the temperature will vary from about 20° C. to about 30° C. and the pressure from slightly below to slightly above atmospheric. It should be understood, of course, that these temperatures and pressures are not critical and are given as illustrative of the preferred operative range of the invention.

Time of treatment will vary with the type, amount and physical characteristics of the materials being treated, the type of treating equipment and other conditions of treatment. When reacting about ½ pound of monochloroacetic acid and ⅓ pound of sodium carbonate at atmospheric temperature and pressure the time of reaction will vary from about ¼ hour to about 3 hours and will usually be about 1 hour. When operating with large batches of the order of about 470 pounds a minimum time of about 1 hour will usually be required for the reaction to go to completion. Generally, it has been found that a more than 90% reaction takes place in a few minutes while a more than 98% reaction takes place in from 1 to 3 hours, depending on the conditions of treatment. It will be understood, of course, that the time of reaction may be varied over wide limits, depending upon the result sought. Thus, for example, where partial reaction of the ingredients is desired, for any reason, the mixing may be terminated at any suitable time interval after initiation thereof.

The reaction, in accordance with the present invention, is more readily accomplished when both reagents are finely divided. Hence, it is preferred to utilize the reagents in a state of subdivision such that the individual particles vary from about 70 microns to about 700 microns in diameter. However, this is not essential and the reaction will take place when the particles are of the size of 3000 microns and above in diameter, though not quite as readily.

Any of the alkali metal and alkali earth metal carbonates and bicarbonates may be utilized for the purposes of this invention. However, the carbonates and particularly the substantially anhydrous carbonates, are preferred since the residual water from neutralization is insufficient to create a "wetness" or partial solution of the salt with a consequent tendency to cake. The resulting salt is therefore dry and powdery. Where caking is not objectionable and/or it is planned to dry the resulting product prior to use, hydrated or partially hydrated carbonates and bicarbonates may conveniently be used. It is desirable, however, that the resulting salt contain not more than about 10% residual water.

The invention is particularly applicable to the preparation of the alkali metal salts and the alkali earth metal salts of chloroacetic acid. In addition, it may with advantage be applied to the preparation of the alkali metal salts and alkali earth metal salts of other crystalline halogenated lower fatty acids such as dichloroacetic acid, trichloroacetic acid, β-chloropropionic acid, α-bromo-iso-butyric acid, and the similar substitution products of acetic acid and propionic acid containing bromine and iodine. Also, if desired, the invention may be utilized in preparing mixed alkali metal and/or alkali earth metal salts of the halogenated lower fatty acids. Thus, for example, mixed salts of sodium chloroacetate and calcium chloroacetate may be prepared by reacting in a substantially dry state, chloroacetic acid with sodium carbonate and calcium carbonate. Mixed salts of sodium chloroacetate and magnesium chloroacetate may be prepared in a like manner from chloroacetic acid, sodium carbonate and magnesium carbonate.

It will thus be seen that the present invention provides a simple, effective and economical process for the preparation of the alkali metal salts and alkali earth metal salts of the halogenated lower fatty acids. The process overcomes the disadvantage of foaming encountered in prior art processes and thus requires a shorter reaction time and less reaction space. In addition the process avoids splitting off the chlorine atom since the reaction does not generate heat to any great extent. The product is dry, powdery and easily handled and does not require further processing before use.

What I claim and desire to protect by Letters Patent is:

1. In the preparation of the alkali metal salts and the alkali earth metal salts of halogenated lower fatty acids the improvement which comprises mixing a crystalline halogenated lower fatty acid having from 2 to 4 carbon atoms in the molecule with a carbonate selected from the group consisting of alkali metal carbonates and alkali earth metal carbonates in a substantially dry state.

2. In the preparation of the alkali metal salts and the alkali earth metal salts of halogenated lower fatty acids the improvement which comprises mixing a crystalline halogenated lower fatty acid having from 2 to 4 carbon atoms in the molecule with at least one crystalline carbonate selected from the group consisting of crystalline alkali metal carbonates and crystalline alkali earth metal carbonates.

3. In the preparation of the alkali metal salts of halogenated lower fatty acids the improvement which comprises mixing an alkali metal carbonate with a crystalline halogenated lower fatty acid having from 2 to 4 carbon atoms in the molecule in a substantially dry state.

4. In the preparation of the alkali earth metal salts of halogenated lower fatty acids the improvement which comprises mixing in alkali earth metal carbonate with a crystalline halogenated lower fatty acid having from 2 to 4 carbon atoms in the molecule in a substantially dry state.

5. In the preparation of the alkali metal salts of halogenated lower fatty acids the improvement which comprises mixing a crystalline alkali metal carbonate with a crystalline halogenated lower fatty acid having from 2 to 4 carbon atoms in the molecule.

6. In the preparation of the alkali earth metal salts of halogenated lower fatty acids the improvement which comprises mixing a crystalline alkali earth metal carbonate with a crystalline halogenated lower fatty acid having from 2 to 4 carbon atoms in the molecule.

7. In the preparation of the sodium salts of halogenated lower fatty acids, the improvement which comprises mixing crystalline sodium carbonate with a crystalline halogenated lower fatty acid having from 2 to 4 carbon atoms in the molecule.

8. In the preparation of the potassium salts of halogenated lower fatty acids, the improvement which comprises mixing crystalline potassium carbonate with a crystalline halogenated lower fatty acid having from 2 to 4 carbon atoms in the molecule.

9. In the preparation of the magnesium salts of halogenated lower fatty acids, the improvement which comprises mixing crystalline magnesium carbonate with a crystalline halogenated lower fatty acid having from 2 to 4 carbon atoms in the molecule.

10. In the manufacture of alkali metal salts and alkali earth metal salts of halogenated acetic acid the improvement which comprises mixing crystalline halogenated acetic acid with a crystalline carbonate selected from the group consisting of crystalline alkali metal carbonates and crystalline alkali earth metal carbonates.

11. In the manufacture of sodium monochloroacetate, the improvement which comprises mixing crystalline sodium carbonate with crystalline monochloroacetic acid.

12. In the manufacture of potassium monochloroacetate, the improvement which comprises mixing crystalline potassium carbonate with crystalline monochloroacetic acid.

13. In the manufacture of magnesium monochloroacetate, the improvement which comprises mixing crystalline magnesium carbonate with crystalline monochloroacetic acid.

14. In the manufacture of alkali metal salts and alkali earth metal salts of halogenated acetic acid, the improvement which comprises mixing crystalline halogenated acetic acid with at least two crystalline carbonates selected from the group consisting of alkali metal carbonates and alkali earth metal carbonates.

15. In the manufacture of alkali metal salts of halogenated acetic acid, the improvement which comprises mixing at least two crystalline alkali metal carbonates with crystalline halogenated acetic acid.

16. In the manufacture of alkali earth metal salts of halogenated acetic acid, the improvement which comprises mixing at least two crystalline alkali earth metal carbonates with crystalline halogenated acetic acid.

17. In the manufacture of alkali metal salts and alkali earth metal salts of halogenated acetic acid the improvement which comprises mixing crystalline halogenated acetic acid with a crystalline bicarbonate selected from the group consisting of alkali metal bicarbonates and alkali earth metal bicarbonates.

18. In a preparation of the alkali metal salts and the alkali earth metal salts of chlorinated lower fatty acids the improvement which comprises mixing a crystalline chlorinated lower fatty acid having from 2 to 4 carbon atoms in the molecule with a carbonate selected from the group consisting of alkali metal carbonates and alkali earth metal carbonates in a substantially dry state.

19. In the manufacture of alkali metal salts and alkali earth metal salts of monochloroacetic acid the improvement which comprises mixing crystalline monochloroacetic acid with a crystalline carbonate selected from the group consisting of crystalline alkali metal carbonates and crystalline alkali earth metal carbonates.

BAYARD T. LAMBORN.

REFERENCES CITED

The following references are of record in the file of this patent:

UNITED STATES PATENTS

| Number | Name | Date |
|---|---|---|
| 883,165 | Blumenthal | Mar. 31, 1908 |
| 2,396,115 | Nicholls | Mar. 5, 1946 |